| (12) | United States Patent | (10) Patent No.: | US 12,078,917 B2 |
|---|---|---|---|
| | Homem et al. | (45) Date of Patent: | Sep. 3, 2024 |

(54) SWIVEL MECHANISM FOR A CAMERA

(71) Applicant: Robert Bosch GmbH, Stuttgart (DE)

(72) Inventors: Francisco Homem, Eindhoven (NL); Patrick Bottcher, Kerken (DE)

(73) Assignee: Robert Bosch GmbH, Stuttgart (DE)

( * ) Notice: Subject to any disclaimer, the term of this patent is extended or adjusted under 35 U.S.C. 154(b) by 251 days.

(21) Appl. No.: 17/899,658

(22) Filed: Aug. 31, 2022

(65) Prior Publication Data

US 2023/0073389 A1     Mar. 9, 2023

(30) Foreign Application Priority Data

Sep. 3, 2021    (EP) .................................... 21194702

(51) Int. Cl.
     *G03B 17/56*      (2021.01)
     *F16M 11/14*      (2006.01)

(52) U.S. Cl.
     CPC ........... *G03B 17/561* (2013.01); *F16M 11/14* (2013.01)

(58) Field of Classification Search
None
See application file for complete search history.

(56) References Cited

U.S. PATENT DOCUMENTS

| 7,975,973 | B1 | 7/2011 | Weeden | |
|---|---|---|---|---|
| 8,905,654 | B2 | 12/2014 | Hung et al. | |
| 11,168,735 | B2 * | 11/2021 | Tiefenbrunn | ......... F16C 11/106 |
| 2012/0237196 | A1 * | 9/2012 | Li | .......................... F16M 11/14 |
| | | | | 396/428 |

FOREIGN PATENT DOCUMENTS

| DE | 19712947 B4 * | 2/2006 | ............. B23Q 1/545 |
|---|---|---|---|
| EP | 3246615 A1 | 11/2017 | |
| WO | WO-2019205960 A1 * | 10/2019 | ........... F16M 11/121 |

* cited by examiner

*Primary Examiner* — Rodney E Fuller
(74) *Attorney, Agent, or Firm* — Michael Best & Friedrich LLP

(57) ABSTRACT

A swivel mechanism (200) for orientating a camera includes a base (8) configured to attach to a support structure; a wedge mechanism comprising a first wedge (5) and a second wedge (6) each having an inclined surface (5*d*, 6*b*) on one side, wherein the inclined surface of the first wedge (5*d*) is arranged on the inclined surface of the second wedge (6*b*), a back cover (1) configured to receive a camera head (100), the back cover (1) arranged at a side of the swivel mechanism (200) opposite to the base (8) in a direction of a pan axis (A1), wherein the back cover (1) comprises a joint member (1*a*) connected to the wedge mechanism; a housing (40), arranged in the direction of the pan axis (A1) between the base (8) and the back cover (1), wherein the housing (40) encloses the joint member (1*a*) and the wedge mechanism.

18 Claims, 13 Drawing Sheets

SWIVEL MECHANISM FOR A CAMERA

BACKGROUND

The present invention relates to a swivel mechanism for a camera having three degrees of freedom, and a camera, preferably a bullet shaped camera, including the swivel mechanism.

Bullet shaped cameras are known in the prior art as surveillance or security cameras. The adjustment of these cameras should be as fast, precise and simple as possible. In addition, they should have the ability to reliably hold the rotational position of their three axes under stress from vibration, wind and snow to avoid costly repositioning of the camera head. The resolution of the adjustment of the three axes is also important, as it affects the precision with which the camera head can be aligned in a given area to be monitored.

EP 3 246 615 A1 shows a bullet shaped camera including a swivel mechanism requiring only one screw to fully lock the position of the camera head. However, manual positioning of the camera requires the user to hold the camera with one hand while using a screwdriver to fix the position. Since installation is often done in hard-to-reach places and requires several steps before the desired setting is achieved, the elimination of the tool during the iterative alignment process is an improvement.

SUMMARY

The disclosure provides a swivel mechanism for a camera and a camera comprising the swivel mechanism, wherein the swivel mechanism enables the camera to be adjusted in three axial directions and reliably hold the adjusted position.

The swivel mechanism for orientating a camera comprises a base (mounting box) for attaching the swivel mechanism to a support structure, such as a wall, building ceiling, post or pillar. The swivel mechanism further comprises a back cover for receiving a camera head of the camera. The back cover is arranged at a side of the swivel mechanism opposite to the base. In other words, the base is arranged at one end of the swivel mechanism and the back cover is arranged at the other end of the swivel mechanism in axial direction thereof.

For effecting a swivel functionality, the base and the back cover are movable relative to each other when the swivel mechanism is in an unlocked state, and the base and the back cover are locked relative to each other when the swivel mechanism is in a locked state. For providing a pan and tilt functionality, the swivel mechanism provides for a rotation about a pan axis, which is a first axis of rotation being essentially perpendicular to the mounting surface between the base and the support structure, and a rotation about a tilt axis, which is a second axis of rotation being essentially perpendicular to the pan axis (and essentially parallel to the mounting surface between the base and the support structure). Further advantageously, the swivel mechanism provides for a rotation about a roll axis, which is a third axis of rotation being essentially perpendicular to the tilt axis. A tilt angle is formed between the pan axis and the roll axis.

The back cover comprises a joint member, which is connected to a wedge mechanism of the swivel mechanism. The wedge mechanism comprises a first wedge and a second wedge each having an inclined surface on one side, wherein the inclined surface of the first wedge is arranged on the inclined surface of the second wedge. This means that the inclined surfaces of the first and second wedge are configured to slide relative to each other.

The first wedge is configured to receive the joint member of the back cover on a side opposite to the side having the inclined surface. Preferably, the joint member is connected to the wedge mechanism via an accommodation in the first wedge. This accommodation is, preferably, arranged on the side opposite to the inclined side of the first wedge. The second wedge is arranged with a side opposite to the side having the inclined surface towards the base. Preferably, this side of the second wedge has a plane surface facing a plane surface of the base.

The swivel mechanism further includes a housing arranged in the direction of the pan axis between the base and the back cover, wherein the housing encloses/encases the joint member and the wedge mechanism. The swivel mechanism further comprises a coupling nut for connecting the housing to the base.

The swivel mechanism is lockable by clamping the wedge mechanism against the housing. This can be effected by expanding the wedge mechanism inside the housing or by reducing the space provided by the housing for the wedge mechanism. Thus, the invention provides for two different ways for locking the swivel mechanism. However, the swivel mechanism is designed in such a way that if the coupling nut is fully untightened (disconnected from the base) the wedge mechanism cannot create any clamping load.

Expanding the wedge is effected by a wedge mechanism activating device or means, which is configured to move the first wedge relative to the second wedge. On the other hand, the coupling nut allows for moving the housing towards the base and thus reducing the space inside the housing. Advantageously, a force is acted on the joint member and the wedge mechanism towards the base by the housing when the coupling nut is tightened. Particular, the nut can advantageously be used for provisionally locking the swivel mechanism, especially during installation, and the wedge mechanism activating means can be used for durably locking the swivel mechanism once a suitable alignment has been found.

According to a preferred aspect, the wedge mechanism activating means includes a fixation screw with a screw axis, which is screwed through the housing into the first or the second wedge. By means of the fixation screw, the first wedge and the second wedge can be moved relative to each other. Preferably, the fixation screw has a predetermined angle between the screw axis and the inclined surface of the respective first or second wedge. Screwing the fixation screw into one of the wedges moves said wedge relative to the housing. This transforms the screw tightening clamp load from the axial direction of the fixation screw into axial load along the pan axis, and clamps the wedge mechanism against the housing. One wedge slides along the axial direction of the fixation screw and, due to the inclined surfaces of the first and second wedge the screw load is partially redirected from the axial direction of the fixation screw to the direction of the pan axis. As a result, the other wedge tends to move along the pan axis and generates a load that clamps the joint member between the first wedge and housing. Thus, the swivel mechanism can be durably fixed by means of the fixation screw once the correct alignment of the camera head has been found.

In order to improve the clamping abilities of the wedge mechanism, there may be a low friction and anti-corrosion coating on the fixation screw, such as a dry lubricant coating (PTFE, Molybdenum Disulfide, Tungsten Disulfide, etc.).

Alternatively or additionally, the inclined surfaces of the first and second wedge may be covered with such a coating.

According to a preferred aspect, the housing has a cylindrical shape, and/or the coupling nut is configured to be slid over the housing and tightened by hand. Preferably, the coupling nut is configured to engage with a flange arranged on an outer circumferential of the housing, to pull the housing toward the base when tightening.

Preferably, the coupling nut comprises a plurality of grip ribs disposed on an outer surface thereof. Most preferably, the grip ribs may comprise different patterns of grooves, ridges and levers, to improve hand grip and allow the user to apply higher torque on the coupling nut. Alternatively or additionally, the coupling nut may comprise a textured paint on its outer surface or added polymeric material to improve grip ergonomics.

According to a further preferred aspect, the coupling nut comprises a thread configured to engage with a thread of the base, and a locking screw, configured to be screwed through the coupling nut. Preferably, the thread of the coupling nut and the base may be provided with a low friction coating as mentioned above. Moreover, the thread of the coupling nut and the base may be designed as fine thread having a small pitch angle, to improve transmission of the manual torque applied to the coupling nut by the user. Alternatively or additionally, the fillet angle of the coupling nut may be made of 0 degree instead of the common 30 degree, to increase the clamping load during temporary fixation.

Preferably, the screwed-in locking screw is disposed perpendicular to the pan axis in a groove of the base, which is, preferably, arranged on an outer side of the base between the thread of the base and a side of the base attached to the wall. This means that the locking screw is positioned next to the thread of the coupling nut in the direction to the wall. The locking screw may have a safety feature requiring a special tool to avoid unauthorized tampering. If the coupling nut loosens when the locking screw is screwed-in, the locking screw will hit the upper side of the groove after a few thread turns, thus preventing further loosening of the coupling nut.

Preferably, the angle between the screw axis and the inclined surface of the second wedge is in a range of 10 degrees to 20 degrees. The amplification ratio of the clamp load from the fixation screw to the direction of the pan axis depends on the angle of the inclined surfaces of the first and second wedge relative to the screw axis, and on the friction coefficient between them. A slope angle between 10 and 20 degrees provides a suitable compromise between clamping load and manufacturing tolerances. Most preferably, the angle is about 15 degrees.

According to an embodiment, the joint member comprises a spherical surface and the wedge comprises a hemispherical recess for receiving the joint member. In other words, the joint member and the corresponding recess in the first wedge form a swivel joint or spherical joint.

Preferably, the sliding surface of the joint member and/or the sliding surface of the recess sliding on each other comprise a friction-enhancing coating. The friction-enhancing surface may be a textured surface or a high-friction coating for improving the friction torque, to hold the camera head in a constant position.

Preferably, the housing comprises a first housing part and a second housing part connected via at least one fixation screw. Preferably, the first housing part comprises an opening extending over at least half of a length of the first housing part starting from one end thereof. More preferably, the joint member is configured to tilt in the opening of the first housing part around a tilt axis from a first stop position to a second stop position, wherein the tilt axis is arranged perpendicular to the pan axis. The first and second stop position may be defined by the design of the housing parts, in particular by the design of the opening in the first housing part. Preferably, the first and second stop position may be defined by the design of the housing parts to enable a tilt angle in a range of 90 degrees to 100 degrees around the tilt axis.

Preferably, the back cover is configured to rotate around a roll axis being an axis coaxial to the joint member of the back cover. In other words, the roll axis allows the camera head to rotate about its axis when attached to the back cover, independent of the rotation of the pan axis.

According to a further embodiment, the swivel mechanism may comprise a pan limiter arranged between the base and the back cover, especially between the base and the second wedge, which is configured to limit a rotation of the back cover around the pan axis to a predetermined pan angle. This limitation of rotation is provided by a first limited rotation of the pan limiter relative to the base around a first pan angle, and a second limited rotation of the back cover relative to the pan limiter around a second pan angle. The sum of the first pan angle and the second pan angle is the predetermined pan angle, and can be greater than 360°. The predetermined pan angle may be in a range between 370 degrees and 380 degrees. Preferably, the pan limiter may be formed as a washer having at least two downwardly bent lugs and an upwardly bent lug arranged on an inner circumference of the pan limiter, and a downwardly bent lug arranged on an outer circumference of the pan limiter.

Preferably, the at least two downwardly bent lugs on the inner circumference of the pan limiter may engage with a groove of the base to fix the pan limiter. The groove may be arranged on an inner circumference of the base on a side of the base opposite to a side attached to the wall. Most preferably, there are four downwardly bent lugs engaging with the groove of the base. This allows the pan limiter to be securely fixed to the base.

To limit the rotation of the back cover relative to the pan limiter, the upwardly bent lug on the inner circumference of the pan limiter may impinge at a second protrusion of the second wedge after the second pan angle upon rotation around the pan axis. The second protrusion may be arranged on a side of the second wedge opposite to the side with the inclined surface.

Preferably, the downwardly bent lug on the outer circumference of the pan limiter is configured to move in a guide groove of the base through the first pan angle upon rotation of the pan limiter relative to the base after the upwardly bent lug has impinged at the second protrusion following rotation through the first pan angle. In other words, when the rotation of the pan limiter has been stopped by the second protrusion of the second wedge after the second pan angle, the pan limiter together with the wedge mechanism and the connected back cover may be further rotated in the guide groove through the first pan angle. The guide groove may have a predetermined length and may be arranged on an outer circumference of the base on the side of the base opposite to the side attached to the wall. This enables to add a rotation angle to the rotation limited by the second protrusion, to compensate the angle the lug and the protrusion take when they abut each other, and to realize the predetermined pan angle around the pan axis in a range between 360 degrees and 380 degrees.

Preferably, the upward bent lug may be arranged between two downward bent lugs on the inner circumference of the pan limiter, and the downward bent lug on the outer circumference of the pan limiter may be arranged opposite to the upwardly bent lug on the inner circumference of the pan limiter. This arrangement of the lugs allows for a rotation around the pan axis of slightly less than 360 degrees (e.g., 340 degrees to 350 degrees depending on the design of the second protrusion and the upwardly bent lug on the inner circumference of the pan limiter) and enables a further rotation by means of the downwardly bent lug moving in the outer groove of the base directly after the upwardly bent lug has impinged at the second protrusion. Due to the arrangement of the upwardly bent lug between two downward bent lugs on the inner circumference of the pan limit, the impingement at the second protrusion does not affect the fixation of the pan limiter in the inner groove of the base.

According to a further embodiment, the back cover comprises a neck arranged adjacent to the joint member in a direction of the pan axis on a side of the joint member facing away from the first wedge. The neck may preferably have a cylindrical shape and a length adapted to the shape of the housing to allow free tilt movement of the back cover in the opening of the housing without abutting the latter.

To limit the rotation around the roll axis to a predetermined roll angle, the swivel mechanism may comprise a roll limiter arranged between the base and the back cover, especially arranged on a top surface of the joint member perpendicular to the pan axis and adjacent to the neck of the back cover. The predetermined roll angle may be in a range of −195 degrees to +195 degrees. The roll limiter ensures that electrical/signal cable passing through the swivel mechanism is not twisted indefinitely around the roll axis.

This limitation of rotation is provided by a first limited rotation of the roll limiter relative to the housing around a first roll angle, and a second limited rotation of the back cover relative to the roll limiter around a second roll angle. The sum of the first roll angle and the second roll angle is the predetermined roll angle.

Preferably, the roll limiter may be formed as a semicircular ring having a first protrusion on its inner side and a second protrusion on its outer side. The first protrusion may impinge at a protrusion arranged on a surface of the neck opposite to the inner side of the roll limiter after rotation of the back cover through the second roll angle around the roll axis. After the first protrusion of the roll limiter has impinged at the protrusion of the neck after the second roll angle, the second protrusion may impinge at one side of the opening of the first housing part upon rotation of the back cover around the first roll angle about the roll axis. This means that the first roll angle being a rotation angle, which can be added to the rotation of the roll limiter limited by the protrusion on the neck, depends on the width of the opening of the housing in circumferential direction. To achieve the above defined predetermined angle around the roll axis, the opening of the housing may be designed accordingly.

The proposed positioning of the roll limiter ensures that it is visible from the outside through the opening of the housing. This prevents this rather small part from being forgotten when assembling the camera.

According to the invention, there is further provided a camera comprising the swivel mechanism described above, and a camera head attached to the back cover of the swivel mechanism. Preferably, the camera is a surveillance camera having a bullet shaped camera head, shortly called a "bullet shaped camera".

Summarizing, the swivel mechanism for orientating a camera according to the present invention enables the adjustment of two or three axes of a camera head of a bullet shaped camera relative to its base and avoids excessive twisting of cables going through the swivel mechanism. Furthermore, the swivel mechanism allows for a manual pre-fixation of the camera head by means of the coupling nut until the correct alignment of the camera head is found. To subsequently fix the swivel mechanism in the correct orientation, only one fixation screw is required for secure clamping. The manual pre-fixation as well as the clamping with only one screw simplify the installation and alignment of the camera considerably. Additionally, the proposed swivel mechanism allows infinite position resolution in all three degrees of freedom, especially also in the pan axis, maintaining the desired orientation even under relevant loads.

According to the invention, there is further provided a method for locking a swivel mechanism of a camera, especially a swivel mechanism or of a camera as described before, wherein the swivel mechanism is arranged between a base and a back cover configured to receive a camera head, wherein a coupling nut is configured to provisionally locking the swivel mechanism, wherein an activating means is configured for durably locking the swivel mechanism, especially a wedge mechanism activating means is configured for durably locking the swivel mechanism by a wedge mechanism. This method has the advantage of easily installing and aligning a camera during installation, because the nut can advantageously be used for provisionally locking the swivel mechanism and the wedge mechanism activating means can be used for durably locking the swivel mechanism once a suitable alignment has been found.

BRIEF DESCRIPTION OF THE DRAWINGS

Further advantages and embodiments of the invention are shown in the following description and the accompanying figures. The invention is illustrated schematically by means of examples in the figures and is described below with reference to the figures.

DETAILED DESCRIPTION

Figure 1:
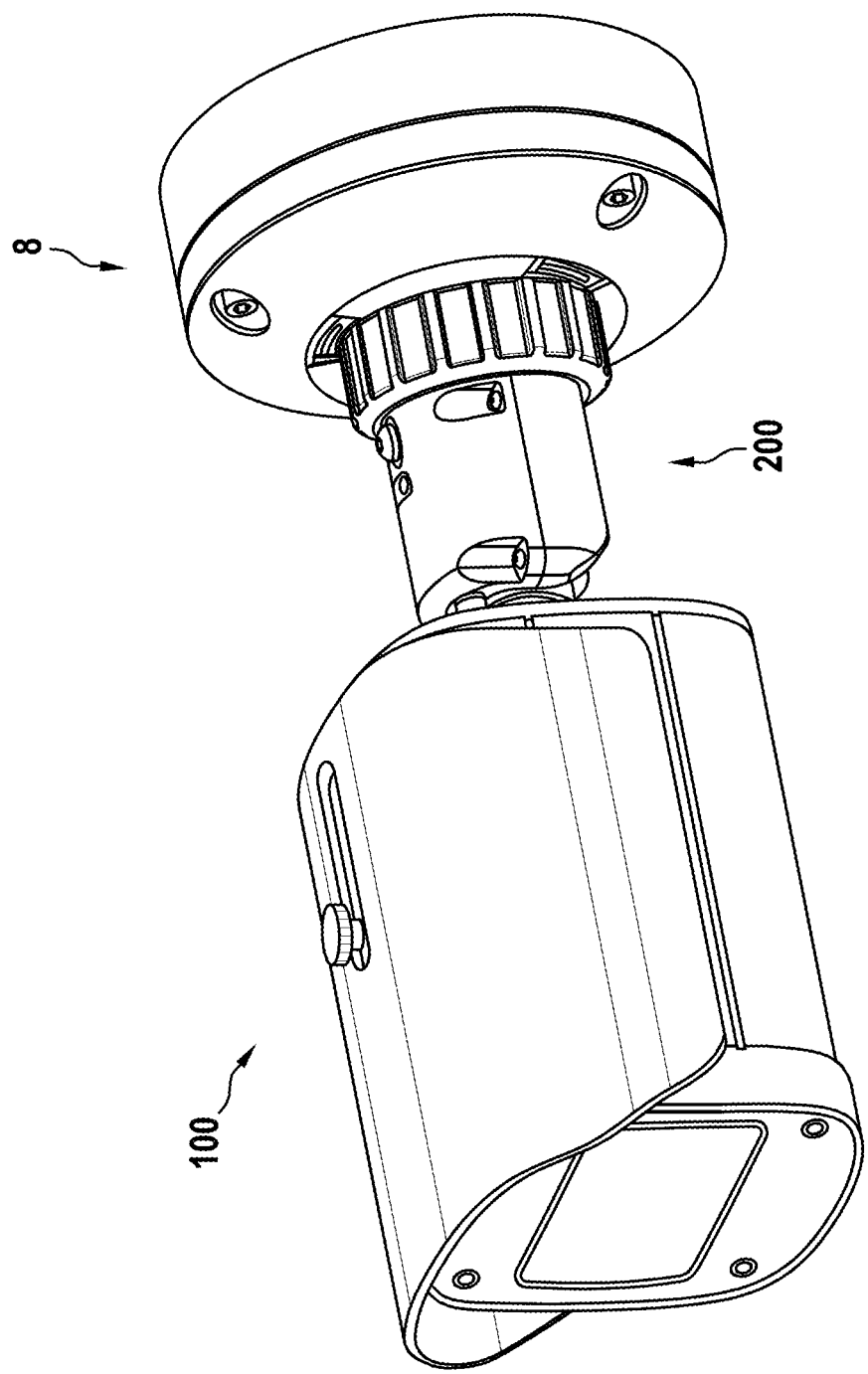
FIG. 1 shows an example of a bullet shaped camera according to the present invention.

FIG. 1 shows an embodiment of the bullet shaped camera according to the invention. The camera comprises a mounting box, also known as base 8, for fixating the camera to a support structure like a wall or ceiling. Moreover, the electrical/signal connections are made inside the base 8. Connected to the base 8 is a swivel mechanism 200 which allows the passage of electrical and signal cables to a camera head 100 that holds the viewing lens and sensor.

The swivel mechanism 200 is a positioning system that allows rotation of the camera head 100 and fixation of a desired position relative to its base 8, while avoiding excessive twisting of the cables passing through the swivel mechanism to prevent damage to them.

Figure 2:
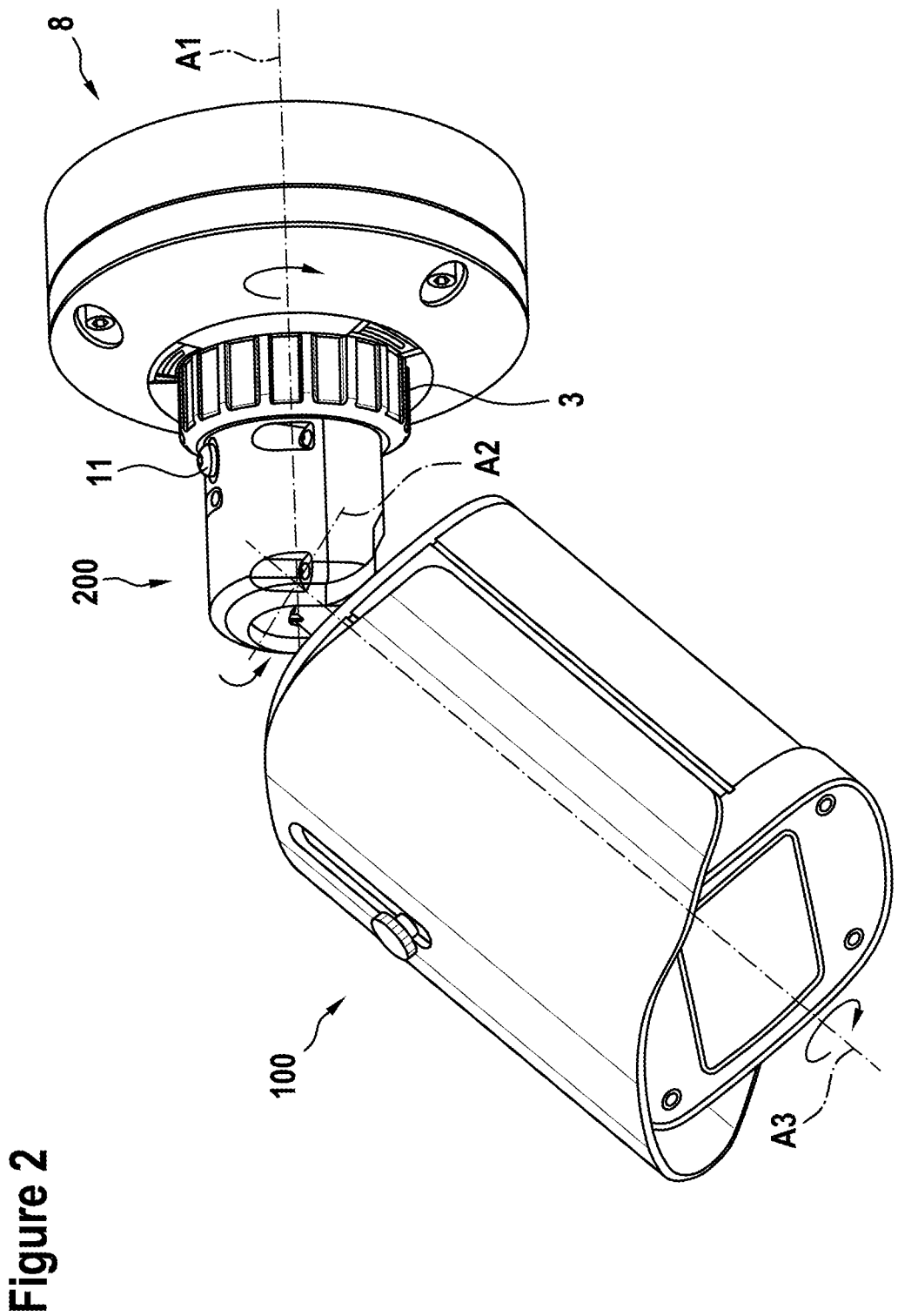
FIG. 2 exemplarily shows the three axes along which the bullet shaped camera of FIG. 1 can be adjusted.

FIG. 2 illustrates the three rotation axes A1, A2, A3 of the camera head 100 by respective arrows around each axis A1, A2, A3. The swivel mechanism 200 enables the adjustment of the camera head along the three axes.

In the following, the first axis of rotation A1 is referred to as "pan axis", wherein this axis is coaxial with the base 8. The second axis A2, which is referred to as "tilt axis", is subjected to the pan rotational position and allows a rotation perpendicular to the pan axis A1. The third axis A3 is the so called "roll axis" which allows a rotation around the axis of the camera head 100. Adjusting the orientation around the first axis A1 affects the orientation of subsequent second and third axes. Likewise, the adjustment of the second axis affects the orientation of the third axis.

The showed swivel mechanism 200 is connected to the base 8 via a coupling nut 3 and its orientation is fixated, i.e. the swivel mechanism is locked, by a single fixation screw 11.

In FIGS. 3 to 11, a preferred embodiment of a swivel mechanism according to the invention is shown in different views and described coherently in the following.

Figure 3:
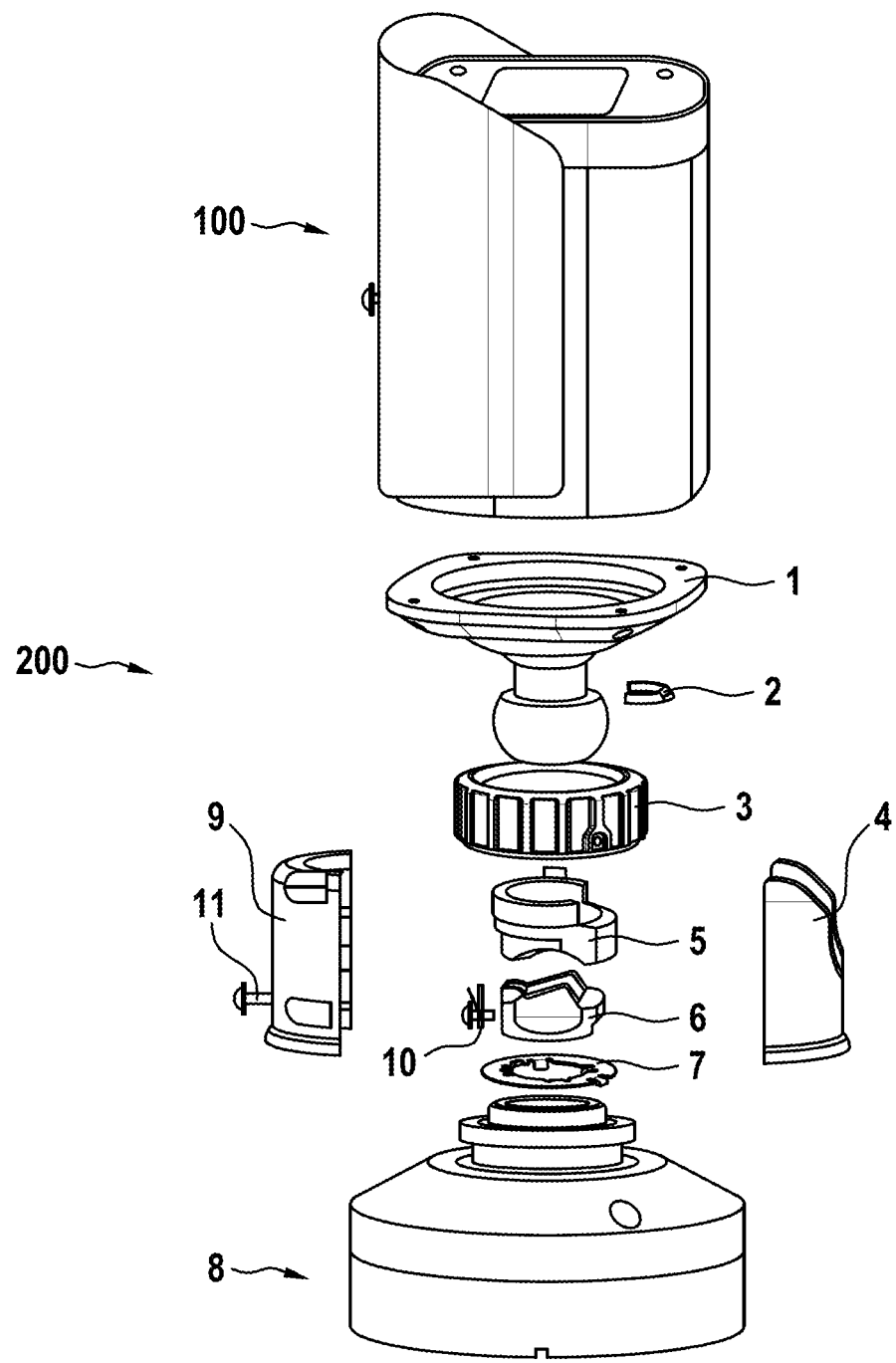
FIG. 3 shows an example of the various parts of the swivel mechanism according to the invention in an exploded drawing.

FIG. 3 shows an exploded view of the various parts of the swivel mechanism as an embodiment. The main parts of the swivel mechanism showed in FIG. 3 are a back cover 1, a roll limiter 2, the coupling nut 3, a first and second housing part 4, 9, a first and second wedge 5, 6 of a wedge mechanism, a pan limiter 7, a base 8, and the fixation screw 11. Additionally, a spring 10 is shown used to provide clearance between the second wedge 6 and the second housing part 9 regardless of the orientation of the swivel mechanism.

Figure 4:
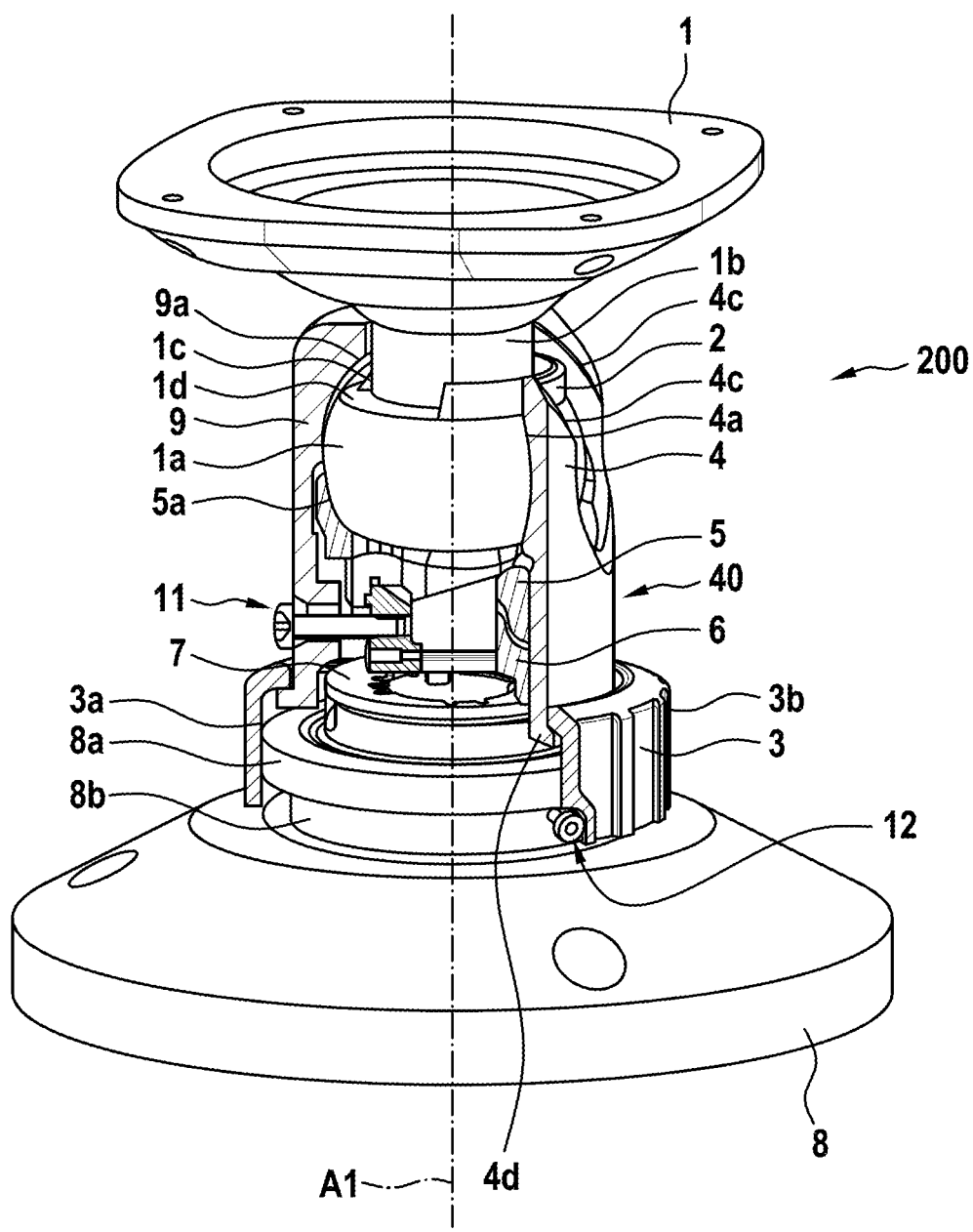
FIG. 4 shows an example of the various parts of the swivel mechanism in an assembly drawing.

In FIG. 4 the exemplary parts of the swivel mechanism are shown in an assembled state, wherein the pan axis A1 of the swivel mechanism is arranged vertically.

The housing 40 of the swivel mechanism 200 is arranged between the back cover 1 and the base 8 and connected to the base 8 by the coupling nut 3. The coupling nut 3 comprises a thread 3*a* engaging in a thread 8*a* of the base 8. Underneath the thread 8*a*, a groove 8*b* is shown on an outside of the base 8 in which a locking screw 12 of the coupling nut 3 is positioned. The locking screw 12 is threaded in the coupling nut 3 and can be moved within the groove 8*b* axially and around the pan axis A1. The locking screw 12 may prevent the coupling nut 3 from loosening by abutting against the top of the groove 8*b* after a few thread turns. Furthermore, the swivel mechanism cannot be disassembled accidentally if the locking-screw 12 requires a special tool to be untightened.

A plurality of grip ribs 3*b* is provided on the outer surface of the coupling nut 3 for improved hand grip when pre-fixating the swivel mechanism while adjusting the camera head.

The pan limiter 7 is arranged in the housing 40 between the base 8 and the second wedge 6, and will be described below in connection with FIGS. 10*a* to 10*c*. The pan limiter 7 serves to limit a rotation of the second wedge 6 and thus back cover 1 and the camera head 100, respectively, around the first axis A1 (pan axis).

Furthermore, the first and second wedge 5, 6 of the wedge mechanism are disposed in the housing 40. The wedge mechanism serves to lock the swivel mechanism (i.e. fixate a position) by applying a force along the first axis A1. The force is applied by expanding the wedge mechanism in the direction of the first axis A1, by moving the second wedge 6 relative to the first wedge 5 along inclined surfaces. For this reason, the locking screw 11 is screwed into the second wedge 6 to pull the second wedge perpendicular to the first axis A1. The particular design of the exemplary first and second wedges will be described below in connection with the FIGS. 6*a* to 7*b*.

A joint member 1*a* of the back cover 1, having here the shape of a sphere, is received by a recess 5*a* of the first wedge 5, having a hemispherical shape, correspondingly. Additionally, the joint member 1*a* is enclosed by inner surfaces 4*a*, 9*a* of the first and second housing parts 4, 9, having a spherical shape, too. Thus, the joint member 1*a* is arranged inside a space formed by the recess 5*a* and the housing and can be tilted around the tilting axis A2 (see FIG. 2), which is perpendicular to the first axis A1. For enabling this tilt movement, the depicted exemplary first housing part 4 includes an upwardly open opening 4*c* that extends from the top for approximately half of the length of the first housing part 4.

The roll limiter 2 is arranged on a top surface 1*d* of the joint member and will be described below in connection with the FIGS. 11*a* to 11*c*. The roll limiter 2 serves to limit a rotation of the back cover 1 and thus the camera head 100 around the third axis A3 (roll axis).

The back cover 1 of the swivel mechanism 200 further comprises a neck 1*b* on which a protrusion 1*c* is arranged for limiting the rotation of the base 1, against which the roll limiter 2 arranged in the opening 4*c* of the housing abuts. The camera head 100 can be mounted on a side of the back cover 1 facing away from the joint member 1*a*.

The swivel mechanism 200 according to the embodiment allows the fixation of the orientation of the camera head 100 around all axes A1, A2 and A3 by friction with infinite resolution. The friction necessary to hold the camera head 100 with its back cover 1 can be generated in two ways. One way, called "pre-fixation", is by manually tightening (by hand without a tool) of the coupling nut 3, which has external grip ribs 3*b* for improved hand grip. The thread 3*a* of the coupling nut 3 engaging with the thread 8*a* of the base creates a force along the pan axis A1, pushing the housing 40 towards the base 8 of the camera via the coupling nut 3 engaging with a flange arranged on the outer circumferential of the swivel housing. Subsequently, the back covert, the first wedge 5, the second wedge 6, and the pan limiter 7 generate a reaction force along the pan axis A1, which creates a clamping load, by friction, of the joint member 1*a*.

The other way, called "final fixation", of fixating the orientation of the wedge mechanism is by tightening the fixation screw 11. This activates (here expands) the wedge mechanism that transforms the screw tightening clamp load from the axial direction of the fixation screw 11 into axial load along the pan axis A1. As explained above, the wedge mechanism comprises the first wedge 5 and the second wedge 6, which slide relative to each other along their inclined surfaces 5*d* and 6*b*. The second wedge 6 slides along the axial direction of the fixation screw, and due to the inclined surfaces of the first and second wedges 5, 6 the screw load is partially converted from the axial direction of the fixation screw 11 to the direction of the pan axis A1. The first wedge 5 tends to move along the pan axis A1 when a movement in the direction of the fixation screw 11 is not possible due to contact with the second housing part 9. This movement of the first wedge 5 along the pan axis A1 generates a load that clamps the sphere surface of the joint member 1a between the sphere surface 5a of the first wedge 5 and the sphere surfaces 4a, 9a of the swivel housing 40.

Due to human ergonomic limitations, a big difference exists between the clamping load of the joint member 1a between the pre-fixation and final fixation. The final fixation method generates considerably higher clamping load than the pre-fixation. The final fixation load is also present at the flange of the coupling nut 3 and this results in that the torque required to untighten the coupling nut 3, after pre-fixation and final fixation are done, is much higher than average maximum male human ergonomic torque. Therefore, a tool is needed to release the clamping force that holds the orientation of the camera head 100 in place so that manipulation of the orientation of the camera head 100 is prevented.

The amplification ratio of the clamp load from the axial direction of the fixation screw 11 to the direction of the pan axis A1 depends on the angle of the inclined surfaces 5d, 6b relative to the direction of the fixation screw and on the friction coefficient between them. Preferably, a slope angle between 10 and 20 degrees is used for optimum compromise between clamping load and manufacturing tolerances. Most preferably, a slope angle of about 15 degrees is used.

Figure 5:
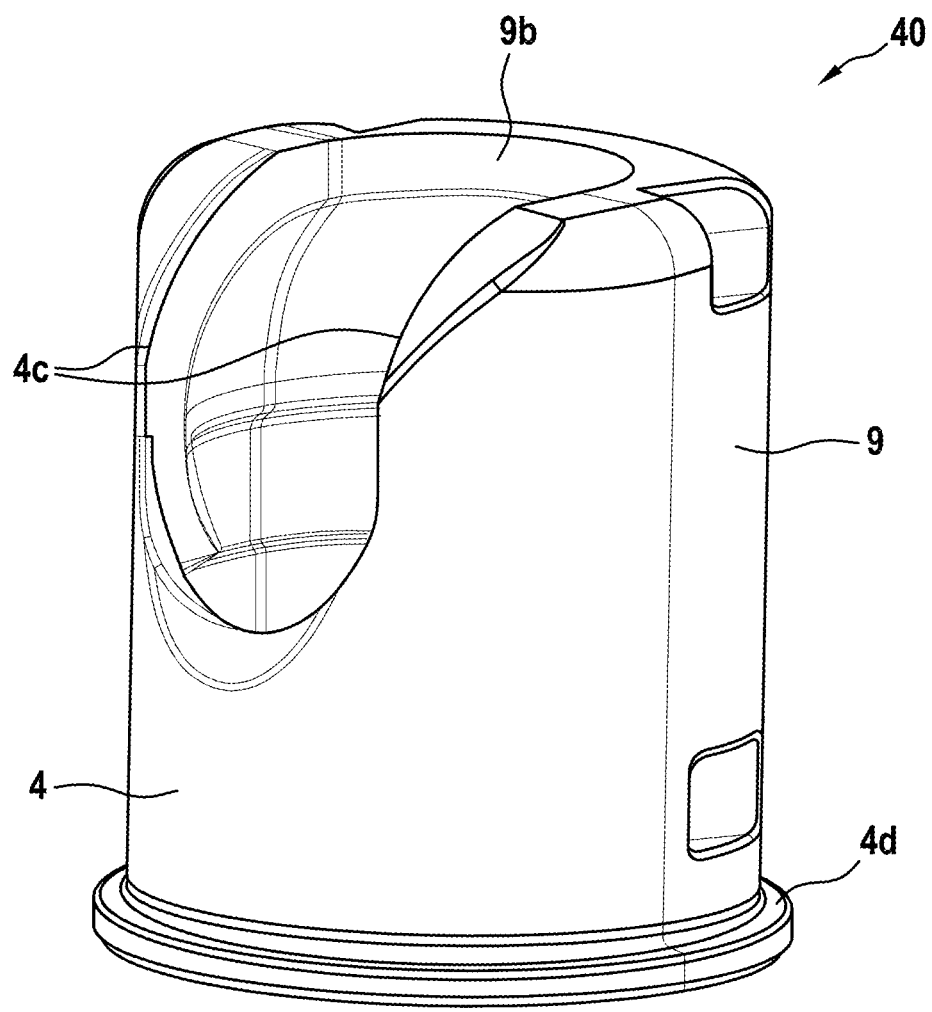
FIG. 5 shows an example of the housing of the swivel mechanism.

FIG. 5 shows the housing 40 of the swivel mechanism according to the embodiment. The housing 40 has a cylindrical shape and includes the first housing part 4 with the opening 4c and the second housing part 9. The opening 4c of the first housing part 4 is arranged adjacent to an opening 9b on top of the second housing part. A flange 4d is arranged on a lower circumference of the housing 40 for engaging with the coupling nut 3. The first and second housing parts 4, 9 are here connected via screw bosses with four screws (not showed).

Figure 6A:
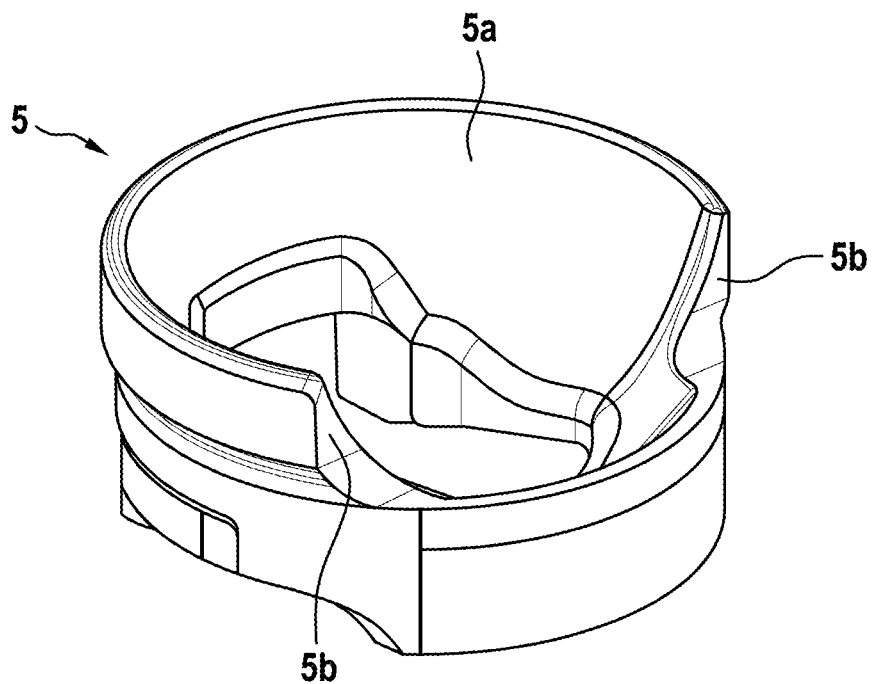
FIGS. 6a, 6b show an example of the first wedge of the swivel mechanism.
Figure 6B:
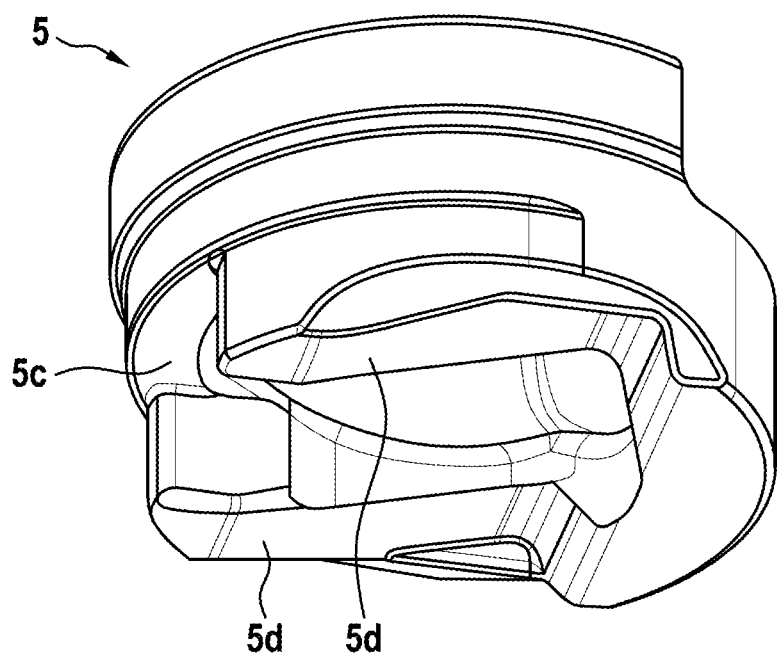

The FIGS. 6a and 6b show the first wedge of the swivel mechanism according to the embodiment.

FIG. 6a shows the upper surface of the first wedge in which the hemispherical recess 5a for receiving the spherical surface of the joint member 1a is integrated. The first wedge 5 further comprises an opening 5b in circumferential direction of the hemispherical recess 5a which may be aligned to the opening 4a of the housing 40 when the first wedge is installed in the wedge mechanism 200.

FIG. 6b shows the lower surface of first wedge on which the inclined surfaces 5d are arranged. Furthermore, there is a pocket 5c on the lower surface of the first wedge into which a first protrusion 6a (see FIG. 7b) of the second wedge is fitted when the wedge mechanism is installed in the housing.

Figure 7A:
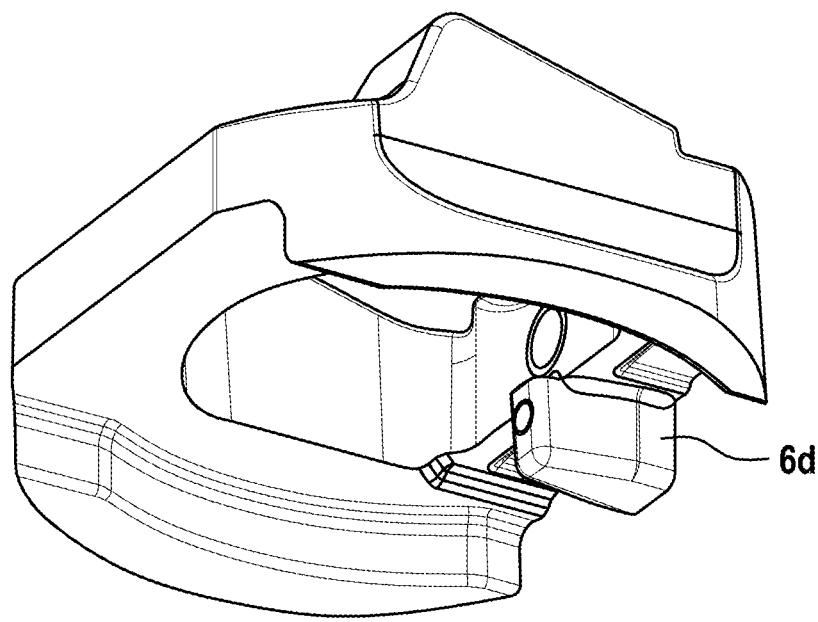
FIGS. 7a, 7b show an example of the second wedge of the swivel mechanism.
Figure 7B:
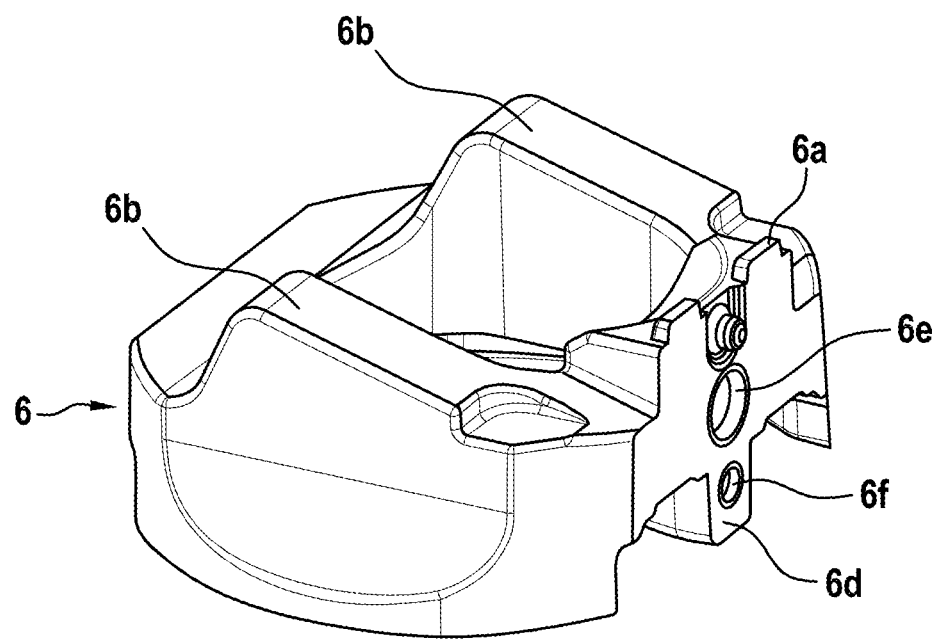

The FIGS. 7a and 7b show the second wedge 6 of the swivel mechanism 200 according to the embodiment.

FIG. 7a shows the lower surface of the second wedge 6, on which two plane surfaces in form of ring segments are arranged. These ring segments may be arranged on a plane surface of the base 8 when the second wedge 6 is installed in the housing. Moreover, the second protrusion 6d for limiting the rotation of the pan limiter 7 (see FIG. 10) is arranged on an outer circumference on the lower side of the second wedge 6.

FIG. 7b shows the upper surface of the second wedge 6, on which the inclined surface 6b is arranged. Additionally, the first protrusion 6a of the second wedge 6, which may be inserted into the pocket 5c of the first wedge, is disposed on an outer circumference on the upper side of the second wedge 6. A bore 6f is disposed in the second protrusion 6d, in which the spring 10 for securing the clearance between the second wedge 6 and the second housing part 9 is arranged. A threaded bore 6e for screwing in the fixation screw 11 is disposed above the bore 6f.

Figure 8:
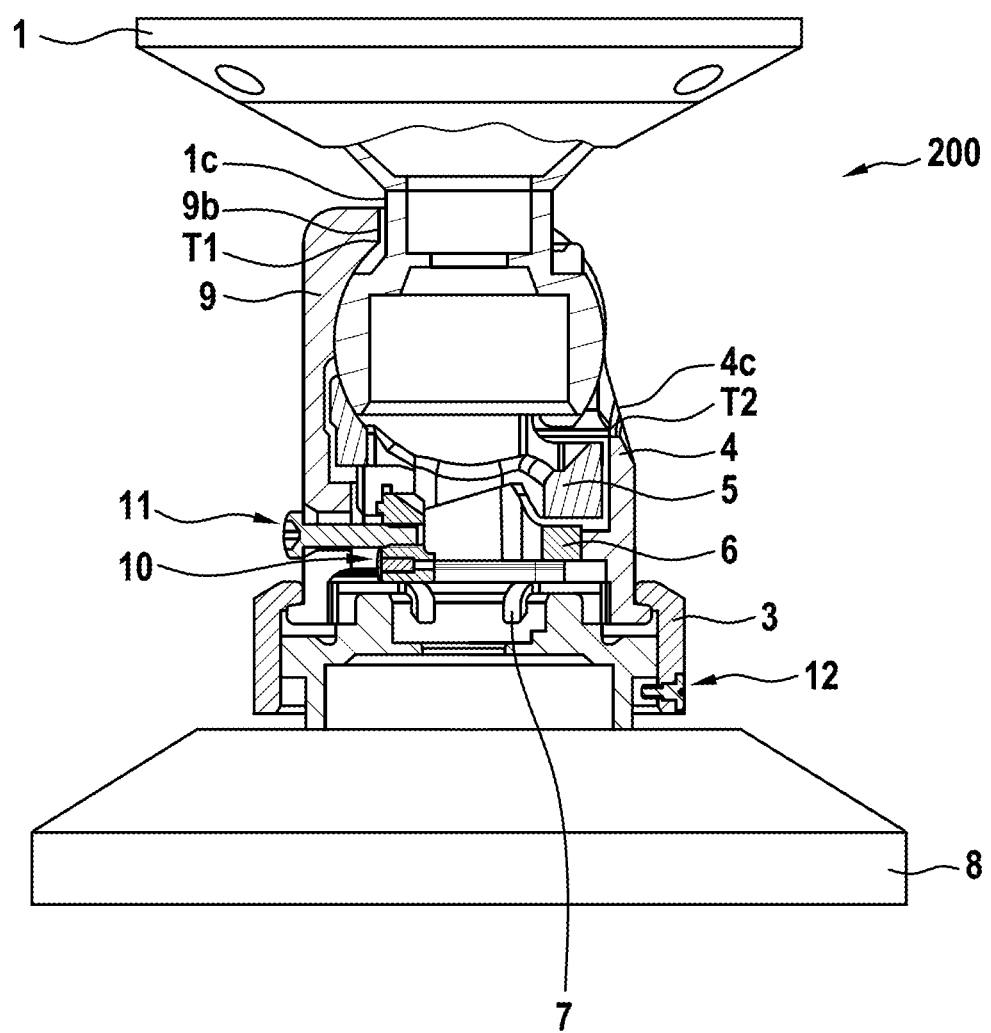
FIG. 8 shows a sectional drawing of an exemplary swivel mechanism according to the invention with the end stop positions of the tilt movement.

FIG. 8 shows a sectional drawing of the swivel mechanism 200 according to the embodiment, illustrating the first and second end stop positions T1 and T2 of the tilt movement. The first end stop position T1 is provided by an inner circumference of the opening 9b on top of the second housing part 9. This means that the tilt movement is limited in one direction when the neck 1b of the back cover abuts the opening 9b. The second end stop position T2 is provided by the lowest point of the opening 4c in the first housing part 4. This means that the tilt movement in the other direction is stopped when the neck 1b reaches the opening 4b at the lowest possible point.

In the swivel mechanism according to the embodiment, the tilt movement around the tilt axis A2 is limited to a range of −10 degrees to +95 degrees. This is achieved by the design of the swivel housing 40, ensuring the rotation of the camera head 100 around the tilt axis A2 allows the neck 1b to move between the end stop positions T1 and T1 of the swivel housing 40.

Figure 9:
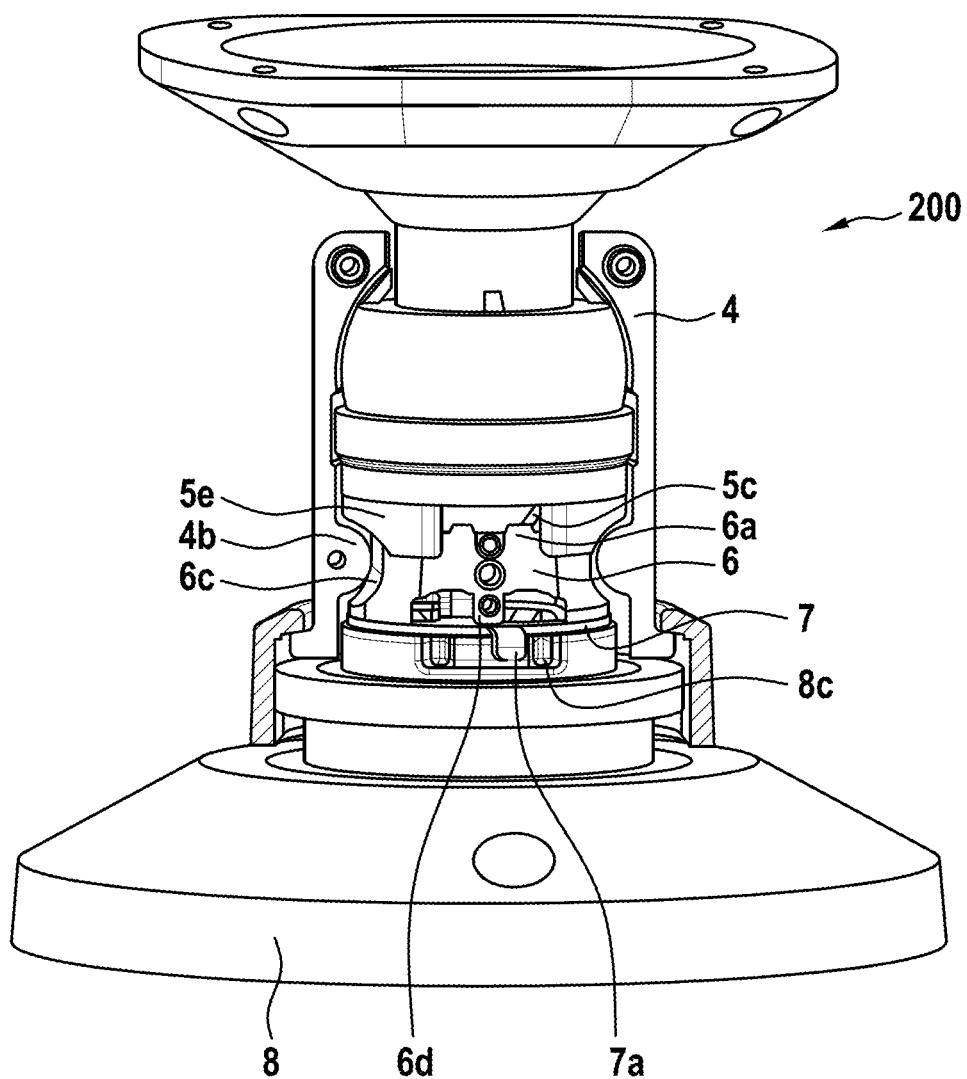
FIG. 9 shows an example of the swivel mechanism of FIG. 8 in a side view with the second housing part removed.

FIG. 9 shows the swivel mechanism 200 according to the embodiment in a side view with the second housing part 9 removed so that the arrangement of the wedge mechanism is visible. To align the inclined surfaces 5d, 6b of the first and second wedge 5, 6, the first protrusion 6a of the second wedge 6 is inserted into the first pocket 5c of the first wedge. This alignment further ensures that the opening 5b of the first wedge 5 is aligned with the opening 4c of the swivel housing 40.

Additionally, the screw bosses 4b of the first housing part 4 are aligned to a second pocket 5e of the first wedge 5 and a pocket 6c of the second wedge 6. This alignment allows for the easy engagement of the fixation screw 11 with the second wedge 6 in case it needs to be replaced, and prevents a rotation of the wedge mechanism around the first axis A1.

Figure 10A:
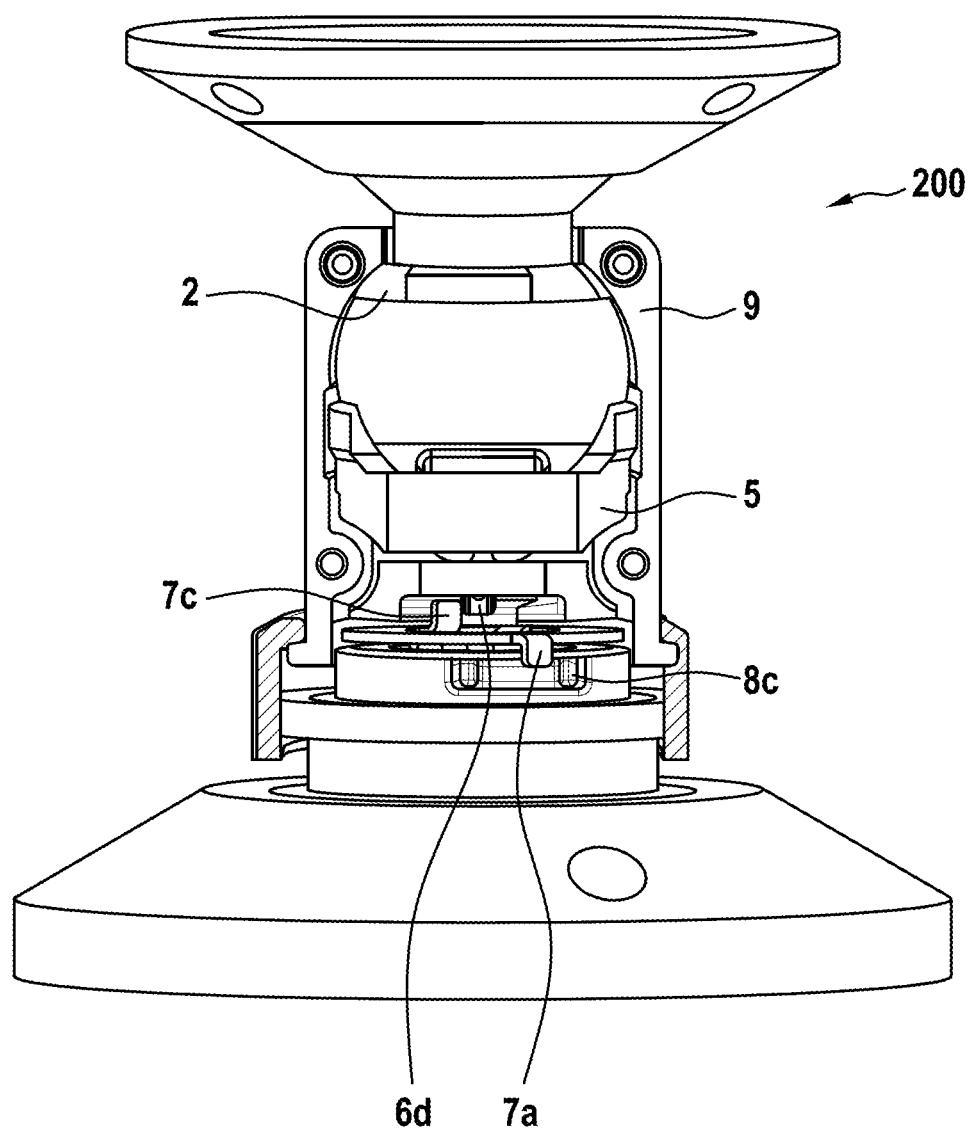
FIGS. 10a, 10b, 10c show an example of a pan limiter of the swivel mechanism of FIG. 8 in an assembled state and as individual part.
Figure 10B:
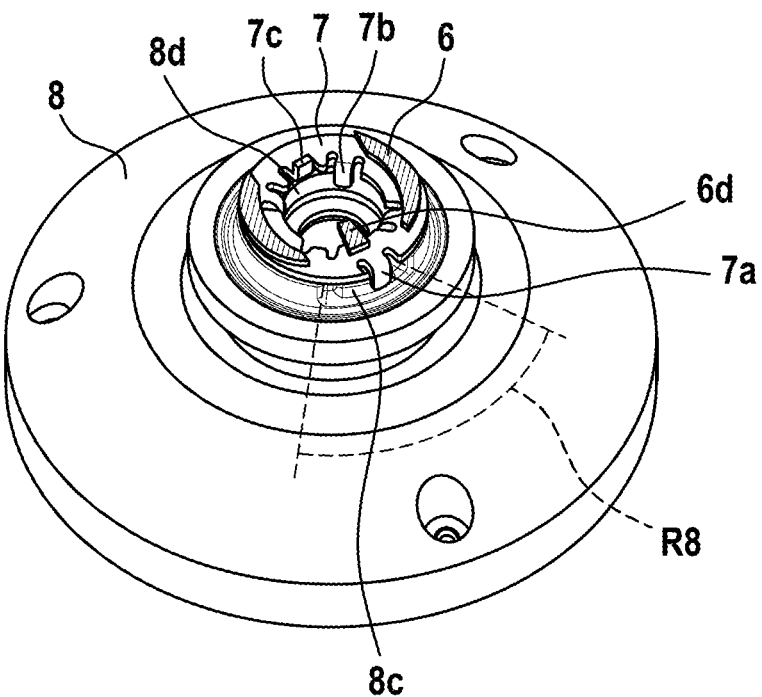
Figure 10C:
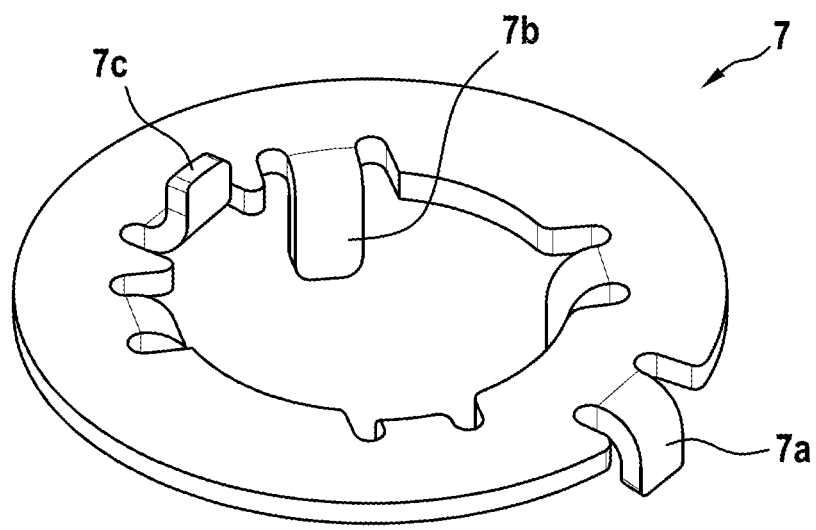

The FIGS. 10a, 10b and 10c show the pan limiter 7 of the swivel mechanism 200 according to the embodiment in an assembled state and as individual part.

FIG. 10c shows an individual drawing of the pan limiter 7 according to the embodiment. The showed pan limiter 7 is formed as a washer having four downwardly bent lugs 7b, an upwardly bent lug 7c on the inner circumference and an downwardly bent lug 7a on the outer circumference.

FIG. 10a shows the swivel mechanism 200 according to the embodiment in a side view with the first housing part 4 removed so that the arrangement of the pan limiter 7 between the base 8 and the second wedge 6 is visible. In the showed arrangement, the upwardly bent lug 7c on the inner circumference of the pan limiter 7 abuts the second protrusion 6d of the second wedge 6. As a result the downwardly bent lug 7a on the outer circumference of the pan limiter 7 moves in the guide groove 8c arranged on an outer surface of the base 8 to add a further angle of rotation R8 to the pan movement. Thus, the rotation of the pan limiter 7 around the base 8 is limited to a first pan angle R8.

FIG. 10b shows a sectional view through a horizontal plane of the second wedge 6 shortly above the pan limiter 7. Thus, the fixation of the pan limiter via the four downwardly bent lugs 7b in the groove 8d of the base 8 is visible. Furthermore, the first pan angle R8 provided by the guide groove 8c is indicated in FIG. 10b.

To limit the rotation of the second wedge 6 (and thus the back cover 1 and the camera head) around the pan limiter 7 (and thus the base 8) the upwardly bent lug 7c on the inner circumference of the pan limiter can impinge at a second protrusion 6d of the second wedge 6 upon rotation of the second wedge 6 around the pan axis A1. Thus, this rotation is limited to a second pan angle, which can be determined by the width of the lug 7c and the width of the second protrusion 6d.

The downwardly bent lug 7a on the outer circumference of the pan limiter 7 is configured to move in a guide groove 8c of the base 8 upon rotation of the pan limiter around the pan axis A1 after the upwardly bent lug 7c has impinged at the second protrusion 6d. In other words, when the rotation of the second wedge 6 relative to the pan limiter 7 has been stopped by interaction of the second protrusion 6d and the lug 7c, the pan limiter 7 together with the wedge mechanism 5, 6 and the connected back cover 1 may be further rotated in the guide groove 8c. This allows a rotation of the swivel mechanism 200 around the pan axis A2 in a freely determinable range, especially of more than 360°, e.g. of 370 degrees to 380 degrees.

Figure 11A:
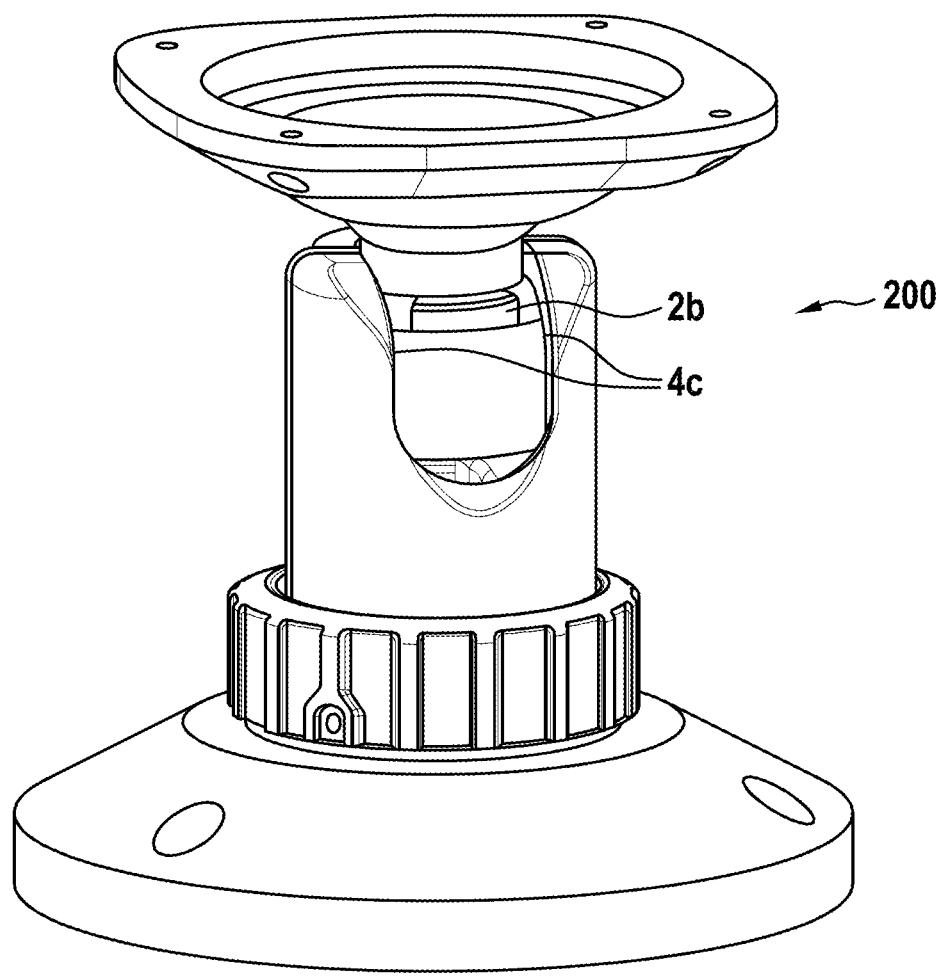
FIGS. 11a, 11b, 11c show an example of a roll limiter of the swivel mechanism of FIG. 8 in an assembled state and as individual part as well as the parts of the back cover accommodating the roll limiter.
Figure 11B:
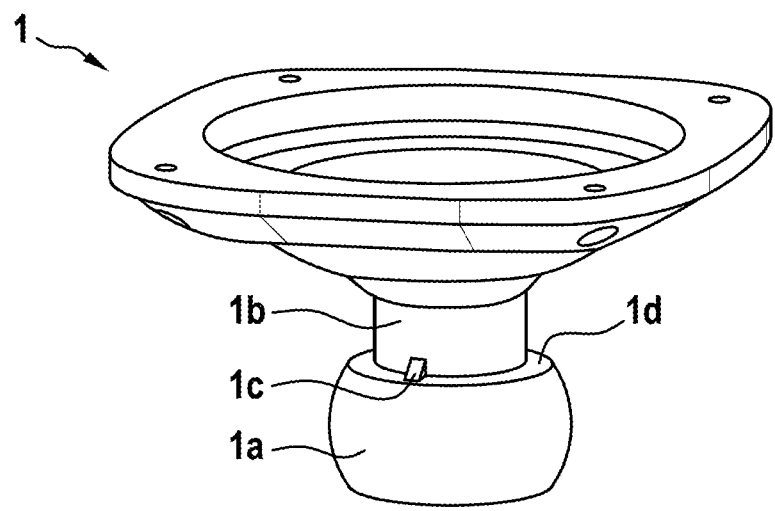
Figure 11C:
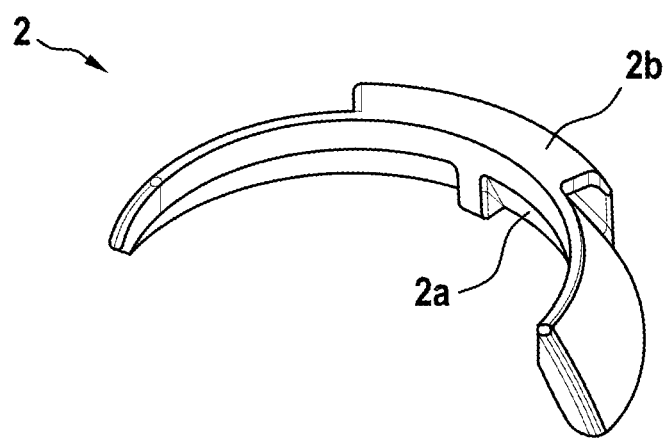

The FIGS. 11a, 11b and 11c show the roll limiter 2 in an assembled state and as individual part as well as the parts of the back cover accommodating the roll limiter according to the embodiment.

FIG. 11a shows the swivel mechanism 200 in an assembled state looking at the opening 4c in the housing 40 so that the second protrusion 2b on the outer surface of the roll limiter 2 is visible.

FIG. 11b shows the back cover 1 of the swivel mechanism 200 with the joint member 1a, the neck 1b and the protrusion 1c on the surface of the neck, and FIG. 11c shows an individual drawing of the roll limiter with the protrusions 2a, 2b on its inner and outer surface.

As shown in FIG. 11a, the roll limiter 2 is disposed on a top surface 1d of the joint member 1a. The roll limiter 2 rotates around the roll axis A3, around the neck 1b of the back cover 1 and is axially located between a top surface 1d of the joint member 1a and the spherical surfaces of the swivel housing 4a, 9a (see also FIG. 4).

Just as the pan limiter 7 does for the pan movement, the roll limiter 2 effectively provides a first and a second roll angle for a rotation of the back cover 1 (and camera head 100) around the roll axis 3, here in form of a rotation of the back cover 1 relative to the housing 40. This allows for a rotation of more than 360 degrees between these parts.

The rotation of the back cover 1 relative to the roll limiter 2 is limited to the second roll angle by the contact between the protrusion 1c on the neck 1b of the back cover 1 and a first protrusion 2a on the inner surface of the roll limiter 2 (see FIG. 11c). The rotation of the roll limiter 2 to the swivel housing 40 (and the base 8) is limited to the first roll angle by a second protrusion 2b on the outer surface of the roll limiter 2 within the opening 4c of the swivel housing 40 (see FIGS. 11a, 11c).

Summarizing, the swivel according to the present invention allows a manual pre-fixation of the camera head by means of the coupling nut until the correct alignment of the camera head is found. To fix the swivel mechanism in the correct orientation subsequently, only one fixation screw is required for secure clamping. The manual pre-fixation as well as the clamping with only one screw simplify the installation and alignment of the camera head considerably. Additionally, the proposed swivel mechanism allows infinite position resolution in all three degrees of freedom, especially also in the pan axis, maintaining the desired orientation even under relevant loads. Furthermore, the roll limiter is visible from the outside which simplifies the assembly of the swivel mechanism.

The invention claimed is:

1. A swivel mechanism (200) for orientating a camera, the swivel mechanism comprising
 a base (8) configured to attach the swivel mechanism (200) to a support structure;
 a wedge mechanism comprising a first wedge (5) and a second wedge (6) each having an inclined surface (5d, 6b) on one side, wherein the inclined surface of the first wedge (5d) is arranged on the inclined surface of the second wedge (6b),
 a back cover (1) configured to receive a camera head (100), the back cover (1) arranged at a side of the swivel mechanism (200) opposite to the base (8) in a direction of a pan axis (A1),
 wherein the back cover (1) comprises a joint member (1a) connected to the wedge mechanism;
 a housing (40), arranged in the direction of the pan axis (A1) between the base (8) and the back cover (1), wherein the housing (40) encloses the joint member (1a) and the wedge mechanism,
 wherein the first wedge (5) is configured to receive the joint member (1a) of the back cover (1) on a side opposite to the side having the inclined surface (5d), and the second wedge (6) is arranged with a side opposite to the side having the inclined surface (6d) towards the base (8);
 wherein the base (8) and the back cover (1) are movable relative to each other when the swivel mechanism is in an unlocked state, and the base (8) and the back cover (1) are locked relative to each other when the swivel mechanism is in a locked state,
 wherein the swivel mechanism (200) is lockable by a coupling nut (3), which is configured to connect the housing (40) to the base (8), and
 wherein the swivel mechanism (200) is lockable by a wedge mechanism activating device (11), which is configured to move the first wedge (5) relative to the second wedge (6).

2. The swivel mechanism according to claim 1, wherein the wedge mechanism activating device (11) comprises a fixation screw (11) having a screw axis and being screwed through the housing (40) into the first or the second wedge (5, 6).

3. The swivel mechanism according to claim 2, having a predetermined angle between the screw axis and the inclined surface (5d, 6b) of the respective first or second wedge (5, 6).

4. The swivel mechanism according to claim 1, wherein the housing has a cylindrical shape and/or the coupling nut (3) is configured to be slid over the housing (40) and tightened by hand.

5. The swivel mechanism according to claim 1, wherein the coupling nut (3) is configured to engage with a flange (4d) arranged on an outer circumference of the housing (40), to pull the housing (40) toward the base (8) when being tightened.

6. The swivel mechanism according to claim 5, wherein a force is acted on the joint member (1a) and the wedge mechanism (5, 6) towards the base (8) by the housing (40) when the coupling nut is tightened.

7. The swivel mechanism (200) according to claim 1, wherein the coupling nut (3) comprises a plurality of grip ribs (3b) disposed on an outer surface thereof.

8. The swivel mechanism (200) according to claim 1, wherein the coupling nut (3) comprises a thread (3a) configured to engage with a thread (8a) of the base (8), and a locking screw (12) configured to be screwed through the coupling nut (3), wherein the screwed-in locking screw (12) is disposed perpendicular to the pan axis (A1) in a groove (8b) of the base (8), and the groove (8b) is arranged on an outer side of the base (8) between the thread (8a) of the base (8) and a side of the base (8) attached to the support structure.

9. The swivel mechanism (200) according to claim 1, wherein the first wedge (5) comprises a recess (5a) for receiving the joint member (1a), wherein a sliding surface of the joint member (1a) and/or a sliding surface of the recess (5a) sliding on each other comprise a friction-enhancing coating.

10. The swivel mechanism (200) according to claim 1, comprising a pan limiter (7) arranged between the base (8) and the back cover (1) and configured to limit a rotation of the back cover (1) around the pan axis (A1) to a predetermined pan angle being provided by a first limited rotation of the pan limiter (7) relative to the base (8) around a first pan angle (R8) and a second limited rotation of the back cover (1) relative to the pan limiter (7) around a second pan angle.

11. The swivel mechanism (200) according to claim 10, wherein, the pan limiter (7) is formed as a washer having at least two downwardly bent lugs (7b) and an upwardly bent lug (7c) arranged on an inner circumference of the pan limiter (7), and a downwardly bent lug (7a) arranged on an outer circumference of the pan limiter (7).

12. The swivel mechanism (200) according to claim 11, wherein
the at least two downwardly bent lugs (7b) on the inner circumference of the pan limiter (7) are configured to engage with a groove (8d) of the base (8) to fix the pan limiter (7), wherein the groove (8d) is arranged on an inner circumference of the base (8) on a side of the base opposite to a side attached to the support structure, and/or
the upwardly bent lug (7c) on the inner circumference of the pan limiter (7) is configured to impinge at a second protrusion (6d) of the second wedge (6) upon rotation around the pan axis,
wherein the second protrusion (6d) is arranged on a side of the second wedge (6) opposite to the side with the inclined surface (6b), and/or
the downwardly bent lug (7a) on the outer circumference of the pan limiter (7) is configured to move in a guide groove (8c) of the base (8) upon rotation around the pan axis (A1) after the upwardly bent lug (7c) has impinged at the second protrusion (6d), wherein the guide groove (8c) has a predetermined length and is arranged on an outer circumference of the base (8) on the side of the base opposite to the side attached to the support structure.

13. The swivel mechanism (200) according to claim 12, wherein the upwardly bent lug (7c) is arranged between two downwardly bent lugs on the inner circumference of the pan limiter (7), and the downwardly bent lug (7a) on the outer circumference of the pan limiter (7) is arranged opposite to the upwardly bent lug (7c) on the inner circumference of the pan limiter (7).

14. The swivel mechanism (200) according to claim 11, wherein the upwardly bent lug (7c) is arranged between two downwardly bent lugs on the inner circumference of the pan limiter (7), and the downwardly bent lug (7a) on the outer circumference of the pan limiter (7) is arranged opposite to the upwardly bent lug (7c) on the inner circumference of the pan limiter (7).

15. The swivel mechanism (200) according to claim 1, comprising a roll limiter (2) arranged between the base (8) and the back cover (1) and configured to limit a rotation of the back cover (1) around a roll axis (A3) to a predetermined roll angle being provided by a first limited rotation of the roll limiter (2) relative to the base (8) around a first roll angle and a second limited rotation of the back cover (1) relative to the roll limiter (2) around a second roll angle.

16. The swivel mechanism (200) according to claim 15, wherein the roll limiter (2) is formed as a semicircular ring having a first protrusion (2a) on an inner side and a second protrusion (2b) on an outer side, wherein the first protrusion (2a) is configured to impinge at a protrusion (1c) arranged on a surface of a neck (1b) of the back cover (1) opposite to the inner side of the roll limiter (2) upon rotation of the back cover (1) around the roll axis (A3), and the second protrusion is configured to impinge at one side of the opening (4c) of the first housing part (4) upon rotation of the back cover (1) around the roll axis (A3) after the first protrusion (2a) of the roll limiter (2) has impinged at the protrusion (1c) of the neck (1b).

17. A camera comprising the swivel mechanism (200) according to claim 1, and a camera head (100) attached to the back cover (1) of the swivel mechanism (200).

18. A method for locking a swivel mechanism (200) according to claim 1,
wherein the swivel mechanism (200) is arranged between a base (8) and a back cover (1) configured to receive a camera head (100),
wherein a coupling nut (3) is configured to provisionally locking the swivel mechanism (200),
wherein an activating device is configured for durably locking the swivel mechanism (200), the activating device including a wedge mechanism activating device (11) configured for durably locking the swivel mechanism (200) by a wedge mechanism.

* * * * *